United States Patent [19]

Nomura

[11] Patent Number: 5,115,496
[45] Date of Patent: May 19, 1992

[54] QUEUE DEVICE CAPABLE OF QUICKLY TRANSFERRING A DIGITAL SIGNAL UNIT OF A WORD LENGTH DIFFERENT FROM A SINGLE WORD LENGTH

[75] Inventor: Masahiro Nomura, Tokyo, Japan

[73] Assignee: NEC Corporation, Tokyo, Japan

[21] Appl. No.: 301,089

[22] Filed: Jan. 25, 1989

[30] Foreign Application Priority Data

Jan. 26, 1988 [JP] Japan .................. 63-13649
Jul. 22, 1988 [JP] Japan ................. 63-184151

[51] Int. Cl.⁵ ............................................ G06F 5/06
[52] U.S. Cl. ........................ 395/250; 364/DIG. 1;
364/239; 364/233.6; 364/244.3; 364/254.5;
364/947.6; 364/960; 364/957.6; 364/926.1;
364/965.4

[58] Field of Search ... 364/200 MS File, 900 MS File;
365/230.05

[56] References Cited

U.S. PATENT DOCUMENTS

| | | | |
|---|---|---|---|
| 3,820,078 | 6/1974 | Curley et al. | 364/200 |
| 3,949,379 | 4/1976 | Ball | 364/200 |
| 4,236,225 | 11/1980 | Jansen et al. | 364/900 |
| 4,271,480 | 6/1981 | Vinot | 364/900 |
| 4,319,324 | 3/1982 | Johnson et al. | 364/200 |
| 4,320,455 | 3/1982 | Woods et al. | 364/200 |
| 4,374,428 | 2/1983 | Barnes | 364/200 |
| 4,502,114 | 2/1985 | Krikor et al. | 364/200 |
| 4,511,967 | 4/1985 | Witalka et al. | 364/200 |
| 4,598,359 | 7/1986 | Boothroyd et al. | 364/200 |
| 4,611,278 | 8/1986 | Boothroyd et al. | 364/200 |
| 4,620,274 | 10/1986 | Boothroyd et al. | 364/200 |
| 5,003,508 | 3/1991 | Hall | 364/900 |

Primary Examiner—Joseph A. Popek
Assistant Examiner—Rebecca L. Rudolph
Attorney, Agent, or Firm—Foley & Lardner

[57] ABSTRACT

In a queque device comprising a first-in-first-out memory device which has first through N-th memory stages and which successively shifts memorized signal units towards the N-th memory stage through which each memorized signal unit is successively produced as a basic sequence of output digital signal units, a supplementary memory is connected to a predetermined one of the memory stages that is for producing an additional sequence of output digital signal units. Both the output digital signal units of the basic and the additional sequences can be simultaneously produced in parallel in the form of two words and are delivered to an instruction execution unit. Thus, two words of the output digital signal units are quickly sent to the instruction execution unit. When each output digital signal unit of the basic sequence is sent from the N-th memory stage, the additional sequence is derived from the (N−1)-th memory stage. The memory device carries out the above-mentioned operation under control of a queue control circuit and a queue pointer.

6 Claims, 10 Drawing Sheets

QUEUE DEVICE CAPABLE OF QUICKLY TRANSFERRING A DIGITAL SIGNAL UNIT OF A WORD LENGTH DIFFERENT FROM A SINGLE WORD LENGTH

BACKGROUND OF THE INVENTION

This invention relates to a queue device for use in carrying out advanced control in a digital computer, a microprocessor, or the like.

A conventional queue device of the type described serves to preliminarily fetch and buffer successive digital signal units, such as instruction code units or data units, prior to execution of each digital signal unit to successively produce output digital signal units one by one. For this purpose, the conventional queue device is intermediate between a control unit and an execution unit and comprises a first-in-first-out memory device having first through last memory stages. In the first-in-first-out memory device, the digital signal units are successively memorized in the first memory stage of the first-in-first-out memory device one at a time as a memorized signal unit. Each memorized unit is successively shifted to the last memory stage to be supplied to the execution unit as each of output digital signal units which may often be called readout digital signals. In this event, each output digital signal unit has the same length as each of the first through last digital signal units. This means that each output digital signal unit fixedly has a single word length when each of the digital signal units is composed of a single word length.

It should be noted in this connection that each of the instruction code units or the data units does not always have a single word length but often has a variable word length, such as a double word length, a triple word length, or the like. Inasmuch as each instruction unit or data unit should be supplied to the execution unit at every word, the queue device must supply the execution unit with each instruction unit or data unit at every word two times or three times when each digital signal unit has a double word length or a triple word length. Therefore, it takes a long time to send each instruction or data unit from the queue device to the execution unit. This results in a reduction of performance in an information processing system comprising such a queue device.

SUMMARY OF THE INVENTION

It is an object of this invention to provide a queue device which is capable of improving performance of an information processing system.

It is another object of this invention of the type described, wherein each instruction code unit or data unit can be quickly transferred to an execution unit of the information processing system even when each unit is composed of a double word, a triple word, or the like.

A queue device to which this invention is applicable comprises a first-in-first-out memory device having first through N-th memory stages, where N represents a predetermined natural number. The first stage is for memorizing successive digital signal units one at a time as a memorized signal unit. The memory device is for shifting the memorized signal unit successively to the N-th stage to produce a basic sequence of output digital signal units in response to the successive digital signal units. According to this invention, the queue device comprises a subsidiary memory connected to an n-th stage of the memory stage, where n represents a predetermined one of 1 through (N−1). The additional memory is supplied with the memorized signal unit shifted to the n-th stage to produce an additional sequence of output digital units in response to the digital signal units successively memorized in the first stage.

Figure 1:
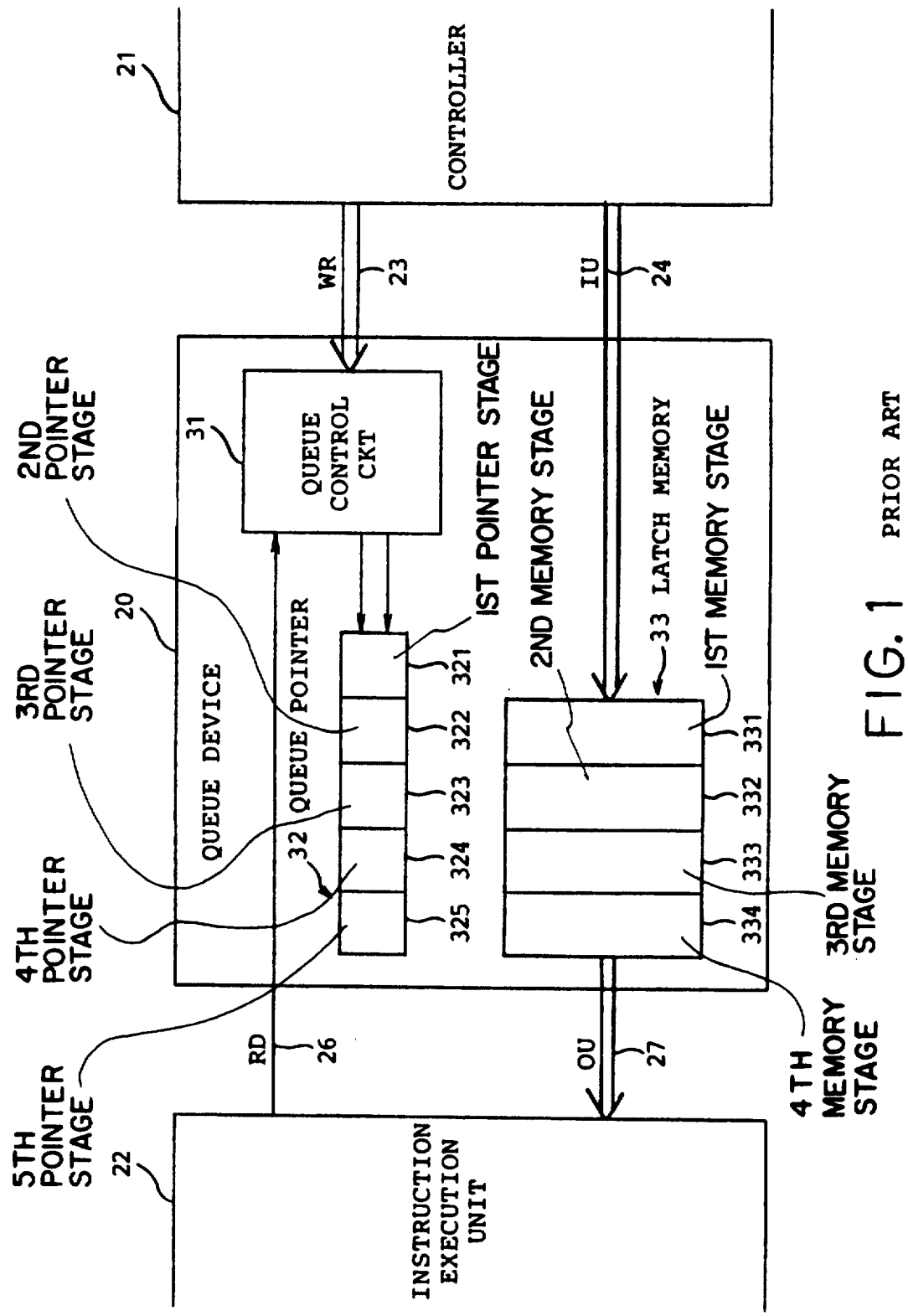
FIG. 1 is a block diagram of a conventional queue device intermediate between a controller and an instruction execution unit.

DESCRIPTION OF THE PREFERRED EMBODIMENTS:

Referring to FIG. 1, description will be made regarding a conventional queue device 20 which is included in an information processing system and which is intermediate between a controller (may be called a bus controller) 21 and an instruction execution unit 22. The information processing system will be considered as a microprocessor system which is operable in a pipeline fashion. It is assumed that the illustrated queue device 20 is supplied as a sequence of input digital signal units with a sequence of input instruction code units IU which is given from the controller 21 to the queue device 20 and which is delivered to the execution unit 22 as a sequence of output digital signal units OU. The output digital signal units OU will be named output instruction code units. In this connection, the queue device 20 may be called an instruction fetch circuit. Each of the input and the output digital signal units IU and OU will be described as an instruction code unit hereinunder but may be a digital data signal unit.

The controller 21 is connected to the queue device 20 through an instruction code write-in signal line (hereafter simply called a write-in line) 23 and an input bus 24. The input bus 24 is formed by a group of parallel lines for transferring a single word of each of the input instruction code units IU in parallel while the write-in line 23 serves to transfer a write-in enable signal WR in synchronism with each of the input instruction code units.

On the other hand, the instruction execution unit 22 delivers a readout enable signal RD to the queue device 20 through a readout signal line 26 to receive the output instruction code units OU one by one through an output bus 27 which is similar to the input bus.

In FIG. 1, the illustrated queue device 20 comprises a queue control circuit 31, a queue pointer 32 controlled by the queue control circuit 31, and a first-in-first-out memory (alternatively called a latch memory) 33 which has first through N-th memory stages where N represents a preselected natural number and may be equal to four as depicted at 331 to 334. Each of the first through fourth memory stages 331 to 334 can store each of the input instruction code units IU as a memorized code unit which is at first stored in the first memory stage. Thereafter, each input instruction code IU is shifted towards the N-th or fourth memory stage.

The queue control circuit 31 is operable in response to the write-in enable signal WR and the readout enable signal RD to control the queue pointer 32 in a manner as will become clear as the description proceeds.

The queue pointer 32 has first through (N+1)-th pointer stages each of which is composed of a single bit. The (N+1)-th pointer stage will be called a fifth pointer stage in the example being illustrated. In this connection, the first through fifth pointer stages are depicted at 321 to 325, respectively. Each pointer stage can be loaded with a logic "0" level or a logic "1" level. It is to be noted that only one of the pointer stages is loaded with the logic "1" level under control of the queue control circuit 31 so as to point a readout memory stage of the latch memory 33. In other words, a readout operation is made from the readout memory stage indicated by the queue pointer 32. This shows that the readout operation is not always made from the fourth or last memory stage 334 of the latch memory 33. In addition, the first pointer stage 321 is loaded with the logic "1" level when the latch memory 33 is wholly empty. Moreover, the logic "1" level is shifted within the queue pointer 32 forwards or backwards under control of the queue control circuit 31. To this end, the queue control circuit 31 supplies the queue pointer 32 with forward and backward shift signals FS and BS which are indicative of shifting a pointer signal of the logic "1" level forwards and backwards, respectively.

The illustrated queue device 20 is operable in first, second, and third modes of operation. The first mode is only for writing one of the input instruction code units in the latch memory 33 while the second mode is only for reading one of the memorized instruction code units out of a selected one of the first through fourth memory stages 331 to 334. On the other hand, the third mode is for writing one of the input instruction code units in the first memory stage 331 simultaneously with reading another instruction code unit out of either one of the memory stages.

Referring to FIG. 2(a) together with FIG. 1, description will be directed to the first mode of writing one of the input instruction code units into the first memory stage 331. The first and the second memory stages 331 and 332 are assumed to be loaded with first and zeroth ones of instruction code units a1 and a0, respectively, and the zeroth instruction code unit is being read out of the second memory stage 332 through the output bus 27. For this purpose, the third pointer stage 323 is loaded with the pointer signal of the logic "1" level.

In FIG. 2(b), a following or second instruction code unit a2 is given to the latch memory 33 through the input bus 24. In this event, the zeroth and the first instruction code units a0 and a1 are forwardly shifted by one stage into the third and the second instruction code units 333 and 332, respectively, with the second instruction code unit a2 stored in the first memory stage 331.

On the other hand, the forward shift signal FS is delivered from the queue control circuit 31 to the queue pointer 32 to forwardly shift the logic "1" level by one stage to the fourth pointer stage 324. Under the circumstances, the zeroth instruction code unit a0 is read out of the third memory stage 333 to be sent to the instruction execution unit 22 through the output bus 27. As a result, the zeroth instruction code unit a0 is kept unchanged after readout of the zeroth instruction code unit a0 even when the second instruction code unit a2 is written in the latch memory 33. This is because a pointer signal of the logic "1" level is stored in the fourth pointer stage 324 and is sent to the latch memory 33.

Figure 3:
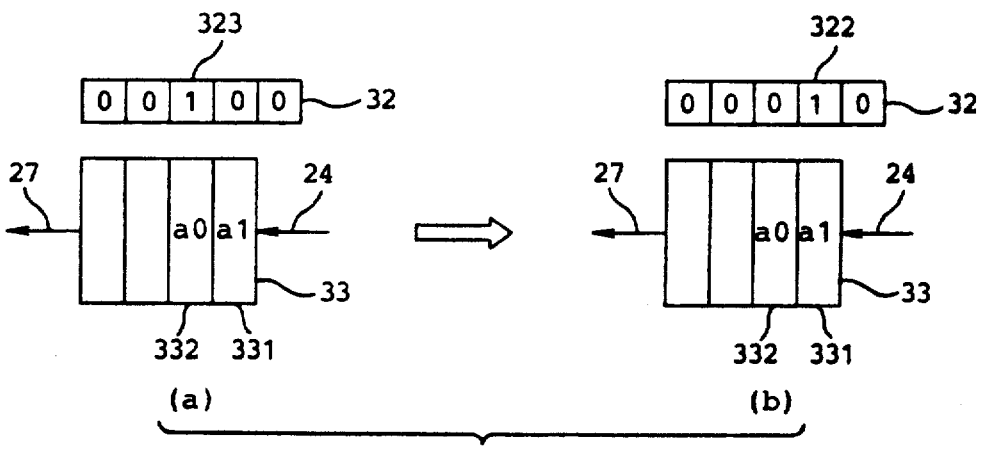
FIG. 3 is a similar block diagram for use in describing a second mode of operation in the queue device illustrated in FIG. 1.

Referring to FIGS. 3(a) and (b) in addition to FIG. 1, the second mode of operation is for reading one of memorized instruction code units out of the latch memory 33. In FIG. 3(a), it is assumed that the zeroth and the first instruction code units a0 and a1 are memorized as the memorized instruction code units in the second and the first memory stages 332 and 331, respectively. It will furthermore be assumed that the pointer signal of the logic "1" level is memorized in the third pointer stage 323 of the queue pointer 32. The readout enable signal RD is sent to the queue control circuit 31. In this case, the queue control circuit 31 puts the backward shift signal BS into an active state to backwardly shift the pointer signal of the logic "1" level by one pointer stage. On the other hand, the zeroth and the first instruction code units a0 and a1 are not shifted and are kept unchanged, as shown in FIG. 3(b). Thus, such backward shift of the pointer signal enables readout operation of the first instruction code unit a1 following the zeroth instruction code unit a0.

Figure 4:
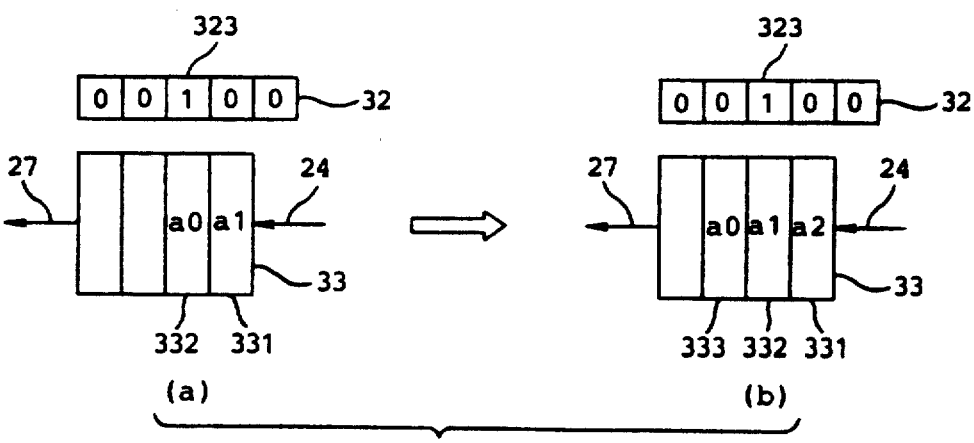
FIG. 4 is a similar block diagram for use in describing a third mode in the queue device illustrated in FIG. 1.

Referring to FIG. 4 together with FIG. 1, description will be made as regards the third mode of simultaneously carrying out write-in operation and readout operation in the latch memory 33. The latch memory 33 and the queue pointer 32 are put into the same states as those of FIGS. 2(a) and 3(a). Under the circumstances, the write-in and the readout enable signals WR and RD are simultaneously supplied from the controller 21 and the instruction execution unit 22 to the queue control circuit 31. In this case, the zeroth instruction code unit a0 is read out of the second memory stage 332 while the second instruction code unit a2 is written in the first memory stage 331. Such write-in of the second instruction code unit a2 in the first memory stage 331 brings about forward shift of the zeroth and the first instruction code units a0 and a1 with the pointer signal kept unchanged in the third pointer stage 323. As a result, the first instruction code unit a1 is read out of the second memory stage 332 of the latch memory 33 and is sent as each of the output instruction code units OU to the instruction execution unit 22 through the output bus 27.

However, the illustrated conventional queue device 20 is disadvantageous in that it takes a long time to transfer the output digital signal units OU from the queue device 20 to the instruction execution unit 22 when each output digital signal unit OU is composed of a double word or more, as mentioned in the background section of the instant specification.

Figure 5:
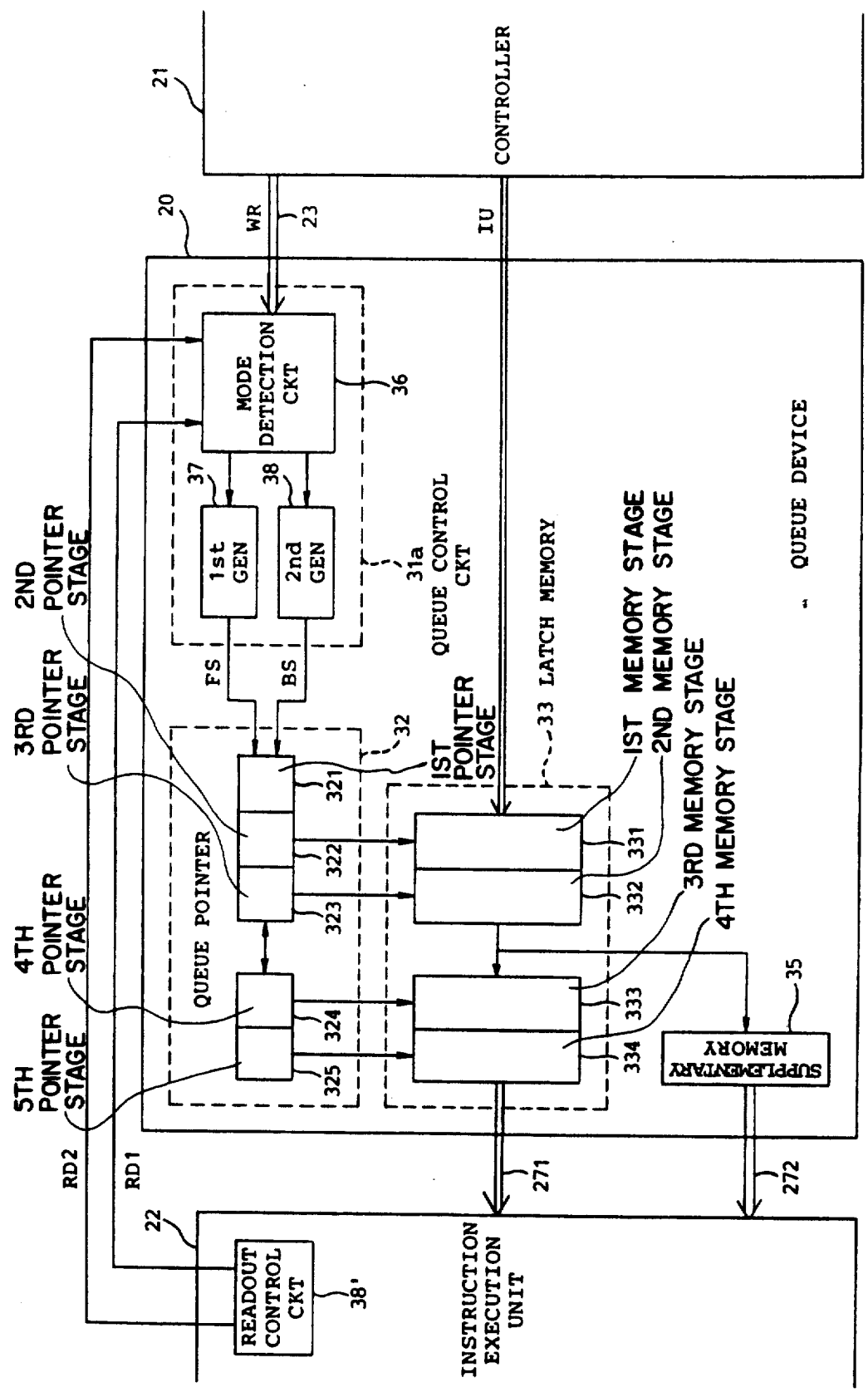
FIG. 5 is a block diagram of a queue device according to a first embodiment of this invention.

Referring to FIG. 5, a queue device 20 according to a first embodiment of this invention comprises similar parts designated by like reference numerals and symbols. In FIG. 5, it is to be noted that the illustrated queue device 20 further comprises a supplementary or subsidiary memory 35 which is connected to the instruction execution unit 22 on one hand and between the second and the third memory stages 332 and 333 of the first-in-first-out memory, namely, the latch memory 33 on the other hand. The supplementary memory 35 has a bit length or capacity of a single word, like each memory stage of the latch memory 33. This shows that the illustrated queue device 20 is connected to the instruction execution unit 22 through first and second output buses which are depicted at 271 and 272 and each of which is for transferring a single word. Specifically, the latch memory 33 successively produces each single word as a sequence of output digital signal units (alternatively called a basic sequence) while the supplementary memory 35 successively produces each single word as another sequence of output digital signal units (or an additional sequence). Accordingly, the illustrated queue device 20 can simultaneously transfer two words to the instruction execution unit 22 under control of the instruction execution unit 22 in a manner to be described later. For this purpose, the instruction execution unit 22 comprises a readout control circuit 38' for producing a first readout enable signal RD1 indicative of readout of a single word and a second readout enable signal RD2 indicative of readout of a double word.

As shown in FIG. 5, the first and the second readout enable signals RD1 and RD2 are supplied to a queue control circuit 31a of the queue device 20 together with the write-in enable signal WR given through the write-in enable signal line 23. The illustrated queue control circuit 31a may be implemented by a logic circuit for producing the forward and the backward shift signals FS and BS in response to the first and the second readout enable signals RD1 and RD2 and the write-in enable signal WR. More particularly, the logic circuit of the queue pointer 31a comprises a mode detection circuit 36 and first and second generators 37 and 38 controlled by the mode detection circuit 36 to produce the forward and the backward shift signals FS and BS, respectively. The mode detection circuit 36 is supplied with the first and the second readout enable signals RD1 and RD2 and with the write-in enable signal WR to detect the first through fifth modes and to energize the first and the second generators 37 and 38 in a manner to be described later.

The forward shift signal FS and the backward shift signal BS are selectively sent to the queue pointer 32 which is operable in a manner similar to that illustrated in FIG. 1. More specifically, the queue pointer 32 has the first through fifth pointer stages 321 to 325. The pointer signal of the logic "1" level is held in only one stage of the queue pointer 32 and is shifted forwards and backwards by one stage in response to the forward and the backward shift signals FS and BS, respectively. In the illustrated queue pointer 32, each of the input instruction code units IU is written in one of the memory stages 331 to 334 that is pointed by the logic "1" level in the queue pointer 32. In this connection, the logic "1" level is memorized in the first pointer stage 321 when the latch memory 33 becomes full of the instruction code units. At any rate, the latch memory 33 is successively loaded at every single word with the instruction code units in accordance with the pointer signal of the queue pointer 32 and carries out a shift operation in cooperation with the queue pointer 32 as suggested by arrowheads between the queue pointer 32 and the latch memory 33. This means that the pointer signal is sent to the latch memory 33 to put a corresponding memory stage of the latch memory 33 into an enable state.

With this structure, the queue device 20 is operable in fourth and fifth modes in addition to the first through third modes which are described before in conjunction with the conventional queue device illustrated in FIG. 1. In the example being illustrated, the first through third modes are related to readout and write-in of a single word while the fourth and the fifth modes are related to readout of a double word. In the first through third modes, the first readout enable signal RD1 is delivered from the readout control circuit 38' of the instruction execution unit 22 to the queue control circuit 31a, like the readout enable signal RD.

Description will be directed to the first through fifth modes to facilitate an understanding of this invention.

Figure 2:
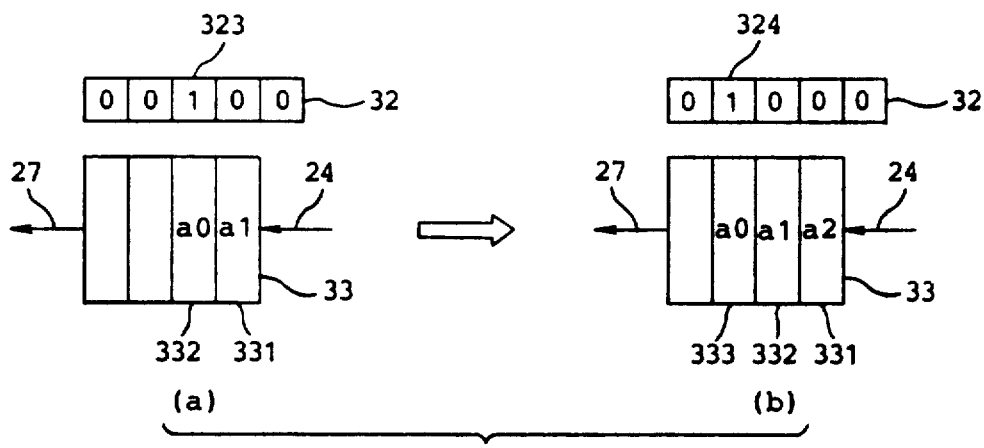
FIG. 2 is a partial block diagram for use in describing a first mode of operation in the queue device illustrated in FIG. 1.
Figure 6:
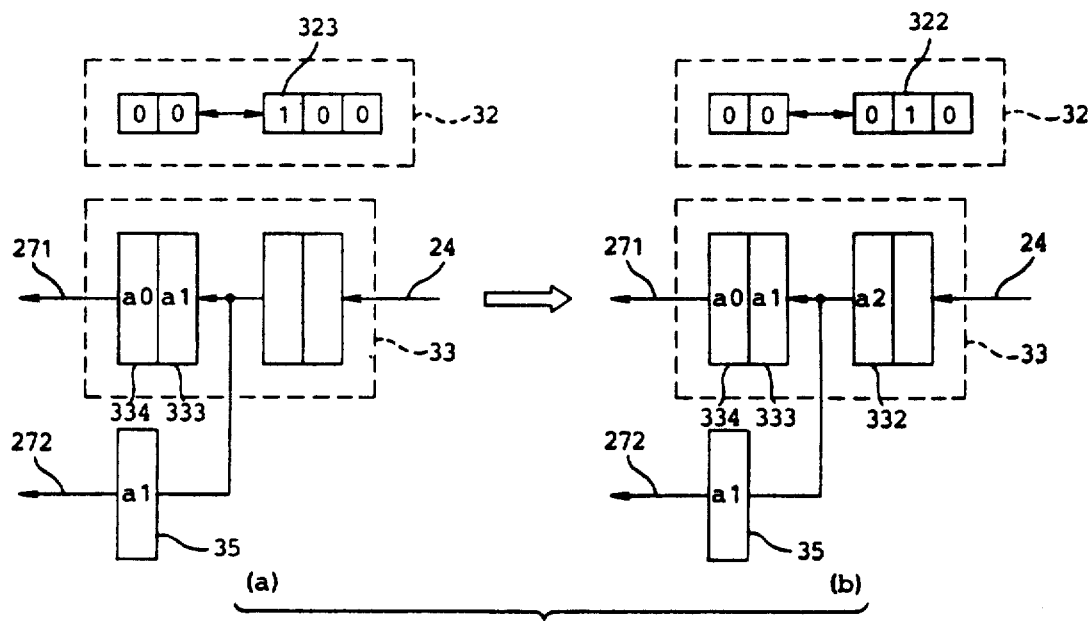
FIG. 6 is a partial block diagram for use in describing a first mode in the queue device illustrated in FIG. 5.

Referring to FIGS. 6(a) and (b) and FIG. 5, the first mode is for writing a single one of the input instruction code units IU in the latch memory 33, like in FIG. 2. In this event, the write-in enable signal WR alone is given from the controller 21 to the queue control circuit 31a. Herein, it is assumed prior to reception of the write-in enable signal WR that zeroth and first instruction code units a0 and a1 are kept in the fourth and the third memory stages 334 and 333, respectively, and the first instruction code unit a1 is held in the supplementary memory 35. In addition, the second and the first memory stages 332 and 331 are assumed to be empty. In this connection, the pointer signal of the logic "1" level is shifted to the third pointer stage 323 of the queue pointer 32, as shown in FIG. 6(a), so as to indicate that the following instruction code unit, namely, the second instruction code unit a2 can be written into the second memory stage 332.

Under the circumstances, the second instruction code unit a2 of a single word is written in the second memory stage 332 of the latch memory 33. In this case, the zeroth and the first instruction code units a0 and a1 are not shifted in the latch memory 33 and the supplementary memory 35 and are therefore kept in the fourth and the third memory stages 334 and 333 and in the supplementary memory 35. This means that both the zeroth and the first instruction code units a0 and a1 are kept unchanged on the first and the second output buses 271 and 272. On the other hand, the queue control circuit 31a delivers the backward shift signal BS to the queue pointer 32 in response to the write-in enable signal WR sent from the controller 21. As a result, the logic "1" level of the queue pointer 32 is shifted backwards by one stage and is stored in the second pointer stage 322, as shown in FIG. 6(b).

Figure 7:
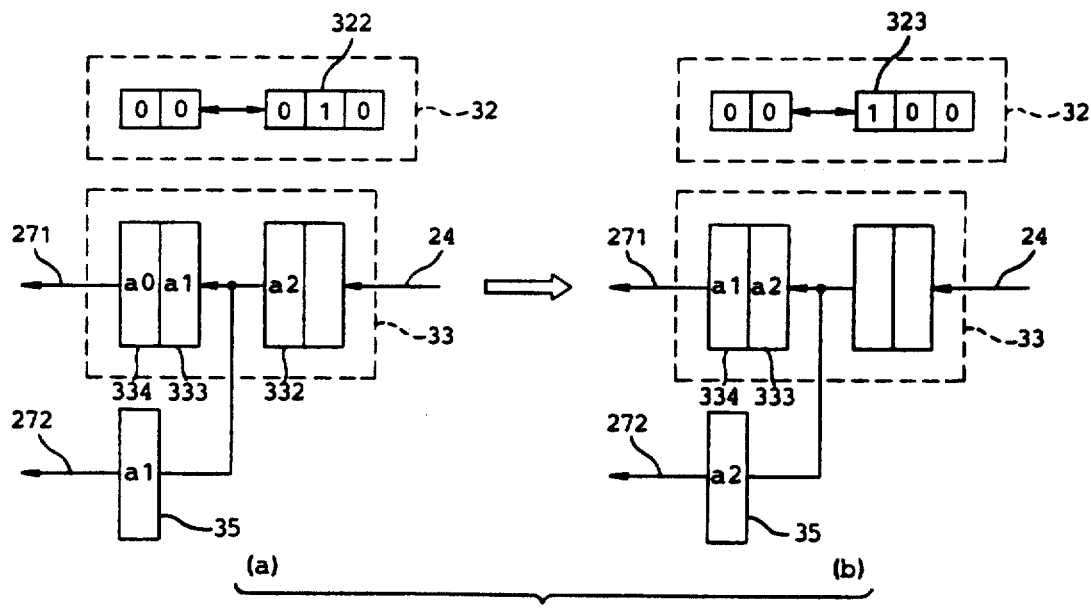
FIG. 7 is a similar block diagram for use in describing a second mode in the queue device illustrated in FIG. 5.

Referring to FIGS. 7(a) and (b) together with FIG. 5, let the first readout enable signal RD1 be supplied from the instruction execution unit 22 to the queue device 20 so as to start the second mode. The second mode is for reading a single word out of the latch memory 33. It is assumed prior to reception of the first readout enable signal RD1 that the zeroth through second instruction code units a0 to a2 are memorized in the fourth through second memory stages 334 to 332 of the latch memory 33, respectively, while the first instruction code unit a1 is memorized in the supplementary memory 35, as shown in FIG. 7(a). In this connection, the pointer signal of the logic "1" level is stored in the second pointer stage 322 to specify the first memory stage 331 as a write-in position of a following input instruction code unit.

After supply of the first readout enable signal RD1, the instruction execution unit 22 reads the zeroth instruction code unit a0 of a single word as the output digital signal unit OU out of the fourth memory stage 334. On the other hand, the queue control circuit 31a shifts the pointer signal forwards by a single pointer stage in response to the forward shift signal FS from the instruction execution unit 22. In this event, the first and the second instruction code units a1 and a2 are shifted forwards by a single memory stage in a known manner. As a result, the first instruction code unit a1 is shifted from the third memory stage 333 to the fourth memory stage 334 while the second instruction code unit a2 is shifted from the second memory stage 332 into both the third memory stage 333 and the supplementary memory 35, as illustrated in FIG. 7(b). Thus, the first and the second instruction code units a1 and a2 appear on the first and the second output buses 271 and 272.

Figure 8:
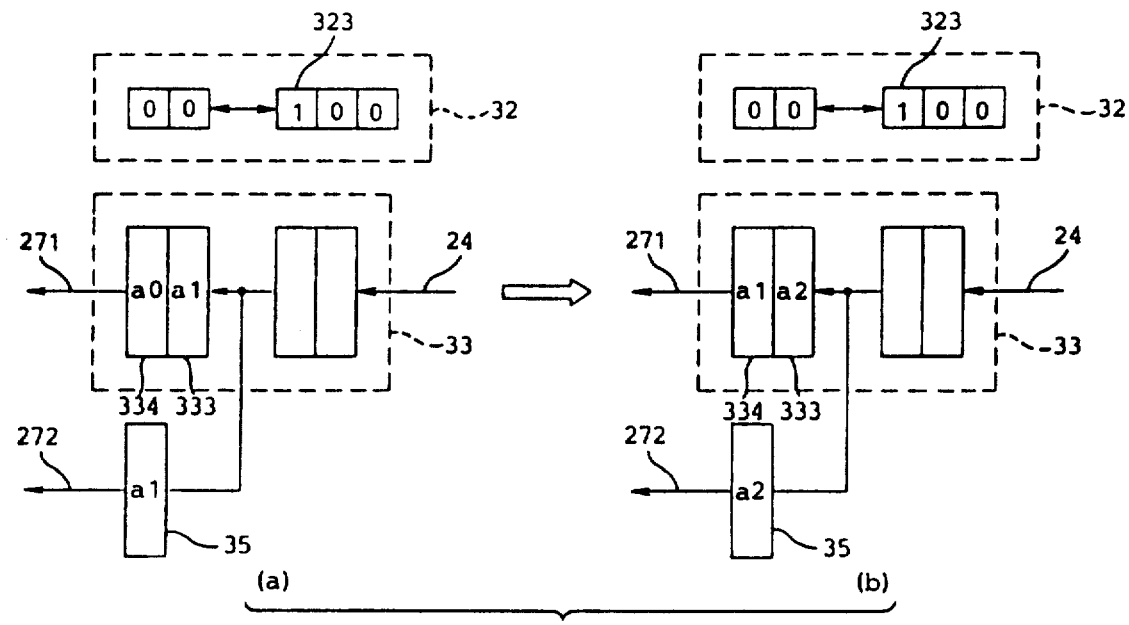
FIG. 8 is a similar partial block diagram for use in describing a third mode in the queue device illustrated in FIG. 5.

Referring to FIGS. 8(a) and (b) in addition to FIG. 5, the third mode is for simultaneously carrying out write-in and readout operations of a single word. In this event, the first readout enable signal RD1 and the write-in enable signal WR are simultaneously supplied from the instruction execution unit 22 and the controller 21 to the queue control circuit 31a, respectively.

Before supply of the first readout enable signal RD1 and the write-in enable signal WR, let the zeroth instruction code unit a0 be memorized in the fourth memory stage 334 while the first instruction code unit a1 is memorized in both the third memory stage 333 and the supplementary memory 35, as shown in FIG. 8(a). In this connection, the pointer signal is memorized in the third pointer stage 323 to indicate that a following instruction code unit, namely, second instruction code unit a2 is to be memorized in the second memory stage 332 specified by the pointer signal memorized in the third pointer stage 323.

When the first readout enable signal RD1 and the write-in enable signal WR are simultaneously given to the queue control circuit 31a, the zeroth instruction code unit a0 is read out of the fourth memory stage 334 and sent to the instruction execution unit 22 through the first output bus 271 while the second instruction code unit a2 is written into the latch memory 33. Simultaneously with write-in operation of the second instruction code unit a2, the latch memory 33 carries out a shift operation forward by one stage. Therefore, the first instruction code unit a1 is memorized in the fourth memory stage 334 while the second instruction code unit a2 is memorized in both the third memory stage 333 and the supplementary memory 35 as illustrated in FIG. 8(b). In this event, the pointer signal of the logic "1" level is kept in the third pointer stage 323. Thus, the first and the second instruction code units a1 and a2 are sent through the first and the second output buses 271 and 272 to the instruction execution unit 22.

Figure 9:
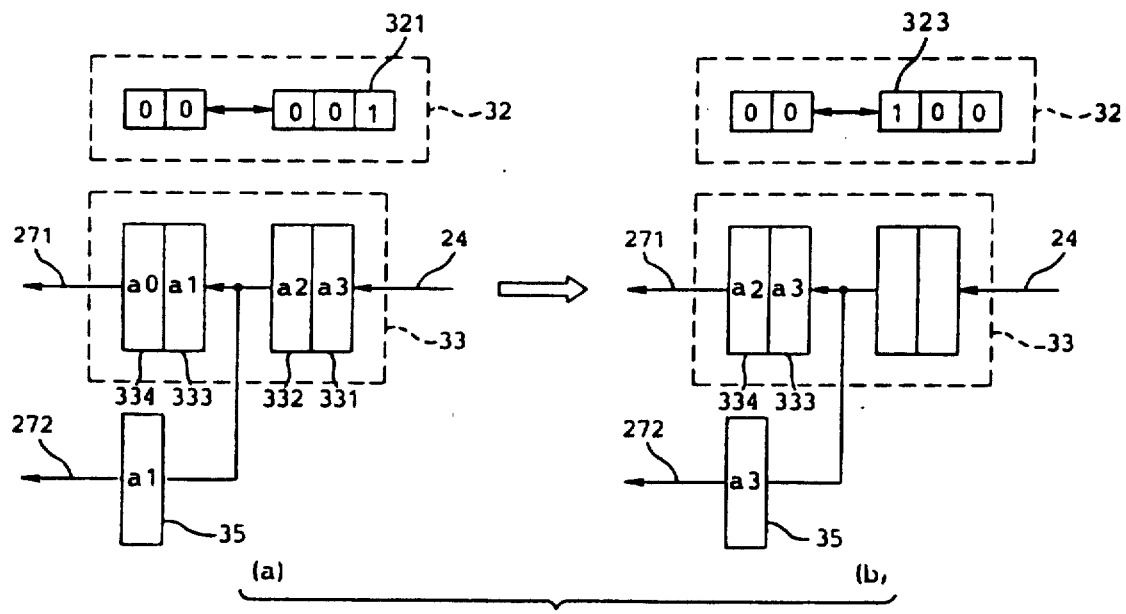
FIG. 9 is a partial block diagram for use in describing a fourth mode in the queue device illustrated in FIG. 5.

Referring to FIGS. 9(a) and (b) and FIG. 5, the fourth mode is for reading a double word out of the illustrated queue device 20. In this case, the latch memory 33 produces the basic sequence of the output digital signal units each of which is composed of a single word and the supplementary memory 35 produces the additional sequence of the output digital signal units each of which is also composed of a single word. In FIG. 9(a), it is assumed that the zeroth through third input instruction code units a0 to a3 are preliminarily memorized in the fourth through first memory stages 334 to 331, respectively. In this connection, the supplementary memory 35 is loaded with the first input digital signal unit a1 while the pointer signal of the logic "1" level is loaded with the first pointer stage 321.

Now, the instruction execution unit 22 fetches both the zeroth and the first input instruction code units a0 and a1 as the output digital signal units of the basic and the additional sequences, respectively, when the second readout enable signal RD2 is delivered from the readout control circuit 38' to the queue control unit 31a. Readout operation of the zeroth and the first input instruction code units a0 and a1 results in a forward shift operation of two memory stages. As a result, the fourth and the third memory stages 334 and 333 are loaded with the second and the third input instruction code units a2 and a3, respectively, with the second and the first memory stages 332 and 331 kept empty, as shown in FIG. 9(b). In addition, the supplementary memory 35 is loaded with the third input instruction code unit a3.

On the other hand, the queue control circuit 31a supplies the forward shift signal FS to the queue pointer 32 two times in response to the second readout enable signal and puts the queue pointer 32 into an active state two times. The pointer signal is shifted forwards in the queue pointer 32 two times into the third pointer stage 323, as illustrated in FIG. 9(b). At any rate, the second and the third input instruction code units a2 and a3 appear on the first and the second output buses 271 and 272, respectively.

Figure 10:
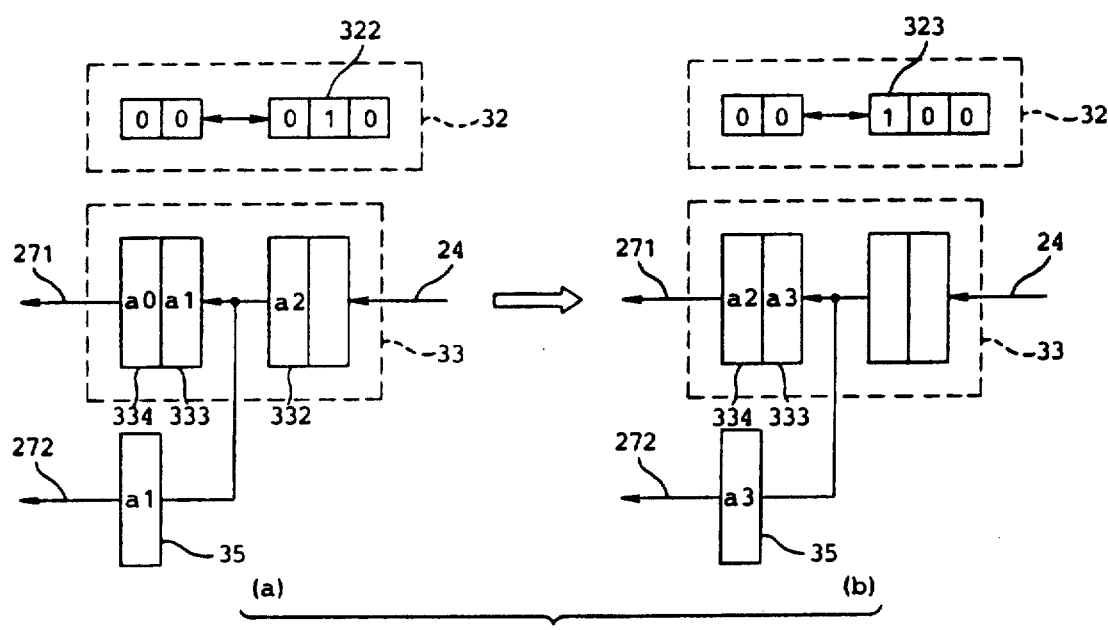
FIG. 10 is a similar block diagram for describing a fifth mode in the queue device illustrated in FIG. 5.

Referring to FIGS. 10(a) and (b) in addition to FIG. 5, the fifth mode is for simultaneously carrying out write-in operation of a single word into the latch memory 33 and readout operation of a double word from the latch memory 33. In this event, the write-in enable signal WR and the second readout enable signal RD2 are concurrently supplied from the controller 21 and the instruction execution unit 22 to the queue control circuit 31a, respectively. In FIG. 10(a), let the zeroth through second input instruction code units a0 to a2 be loaded with the fourth through second memory stages 334 to 332 with the first memory stage 331 kept empty, before the queue device 20 is put into the fifth mode. In this connection, the supplementary memory 35 is loaded with the first input instruction code unit a1 while the logic "1" level is loaded with the second pointer stage 322, as illustrated in FIG. 10(a).

On supply of the second readout enable signal RD2, the instruction execution unit 22 fetches the zeroth and the first input instruction code units a0 and a1 as the output digital signal units of the basic and the additional sequences through the first and the second output buses 271 and 272, respectively. Thus, the zeroth and the first input instruction code units a0 and a1 are read out of the queue device 20. On readout of the double word, the third input instruction code unit a3 is written into the first memory stage 331 and is thereafter shifted by two memory stages together with the second input instruction code unit a2. Consequently, the second and the third input instruction code units a2 and a3 are memorized in the fourth and the third memory stages 334 and 333, respectively, while the third input instruction code unit a3 is memorized into the supplementary memory 35, as illustrated in FIG. 10(b). Thus, the second and the third input instruction code units a2 and a3 appear on the first and the second output buses 271 and 272. In this event, the pointer signal of the logic "1" level is shifted forwards by one pointer stage into the third pointer stage 323, as shown in FIG. 10(b).

Figure 11:
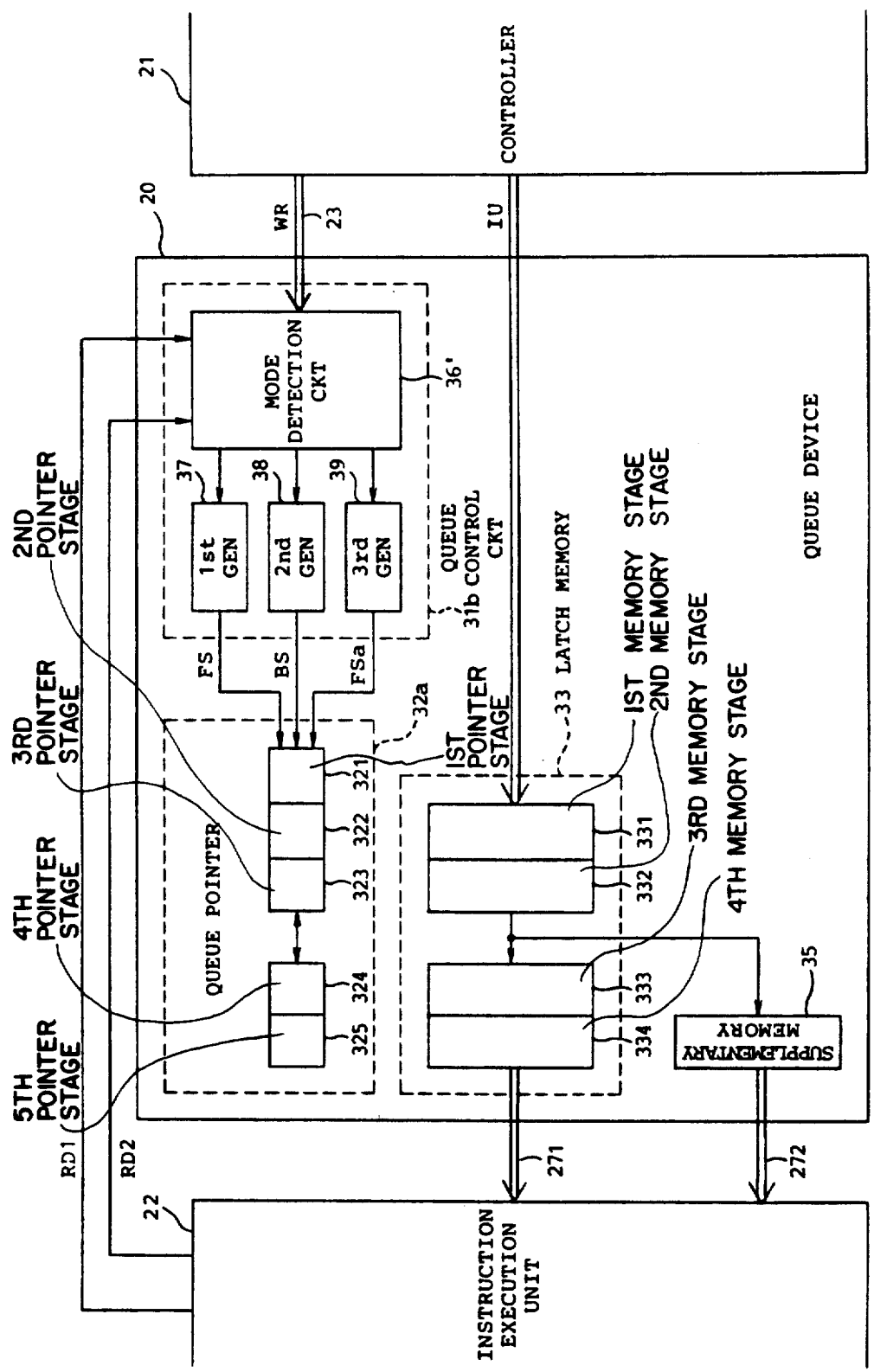
FIG. 11 is a block diagram of a queue device according to a second embodiment of this invention.

Referring to FIG. 11, a queue device according to a second embodiment of this invention is similar to that illustrated in FIG. 5 except that the queue control circuit 31b illustrated in FIG. 11 supplies the queue pointer 32 with an additional forward shift signal FSa in addition to the forward shift signal FS and the backward shift signal BS. The additional forward shift signal FSa serves to shift the pointer signal of the logic "1" level forwards by two pointer stages in the queue pointer 32. Taking this into consideration, the illustrated queue pointer 32a is implemented by first through fifth pointer stages 321 to 325 which are connected so that a forward shift can be carried out by the two pointer stages.

With this structure, the additional forward shift signal FSa is sent from the queus control circuit 31b to the queue pointer 32a in the fourth mode described in conjunction with FIGS. 5 and 9(a) and (b). In order to produce the additional forward shift signal FSa together with the forward and the backward shift signals FS and BS, the queue control circuit 31b comprises a mode detection circuit 36' and first through third generators 37 to 39. The illustrated mode detection circuit 36' distinguishes between the fourth mode and the remaining modes and energizes the third generator 39 when the third mode is detected. The third generator 39 delivers the additional forward shift signal FSa to the queue pointer 32a. The first and the second generators 37 and 38 produce the forward and the backward shift signals FS and BS in the manner described with respect to FIG. 5, respectively. Supplied with the additional forward shift signal FSa, the queue pointer 32a shifts the pointer signal by two pointer stages. Therefore, the illustrated queue pointer 32a is shifted by two pointer stages in response to the additional forward shift signal FSa produced only one time. This makes it useless to produce the forward shift signal FS two times, differing from FIGS. 9(a) and (b). Accordingly, it is possible to continuously read input instruction code units of different lengths or widths out of the queue device 20.

Figure 12:
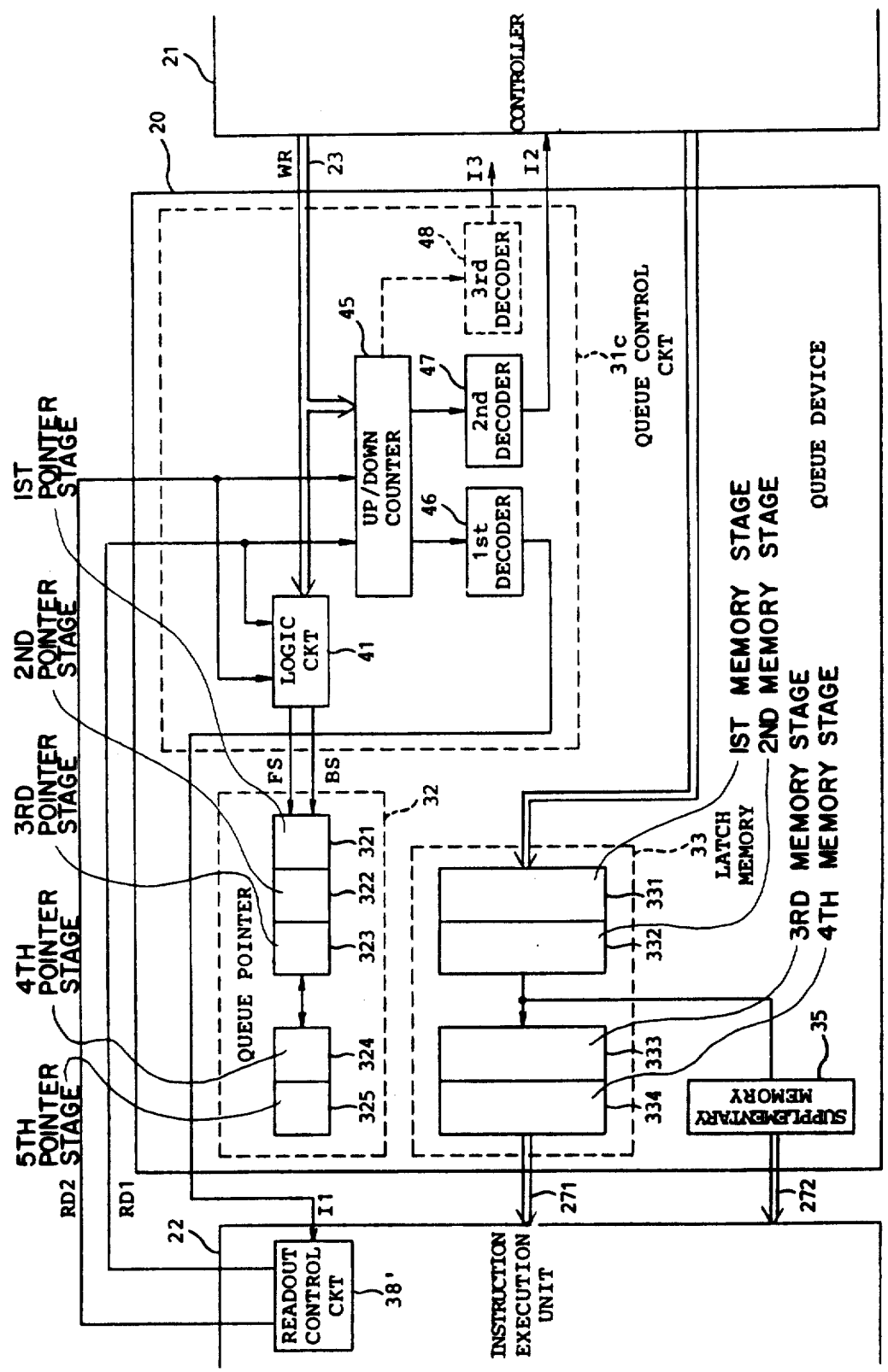
FIG. 12 is a block diagram of a queue device according to a third embodiment of this invention.

Referring to FIG. 12, a queue device 20 according to a third embodiment of this invention comprises similar parts designated by like reference numerals. In FIG. 12, the queue device 20 comprises a queue control circuit 31c supplied from the instruction execution unit 22 with the first and the second readout enable signals RD1 and RD2 and with the write-in enable signal to produce the forward and the backward shift signals FS and BS, like in FIG. 5. The forward and the backward shift signals FS and BS are selectively sent from the queue control circuit 31c to the queue pointer 32. Responsive to either the forward or the backward shift signal FS or BS, the queue pointer 32 shifts the pointer signal of the logic "1" level forwards or backwards by one pointer stage. Thus, the pointer signal is shifted in the queue pointer 32 (FIG. 12) by one pointer stage each time when the forward or the backward shift signal FS or BS is given to the queue pointer 32 in the manner illustrated in FIG. 5. To this end, the illustrated queue control circuit 31c comprises a logic circuit which is depicted at 41 in FIG. 12 and which may be identical with that illustrated in FIG. 5.

Moreover, the illustrated queue control circuit 31c monitors the number of instruction code units memorized in the queue pointer 32 to produce first and second indication signals I1 and I2. The first indication signal I1 indicates that two or more instruction code units are memorized in the latch memory 33 while the second indication signal I2 indicates that the latch memory 33 is full of instruction code units. In order to produce the first and the second indication signals I1 and I2, the illustrated queue control circuit 31c comprises an up-/down counted 45. The up/down counter 45 is successively counted up one by one in response to the write-in enable signal WR and counted down in response to the first and the second readout enable signals RD1 and RD2. The up/down counter 45 is counted down by one and two in response to the first and the second readout enable signals RD1 and RD2, respectively. As a result, a content of the up/down counter 45 is indicative of the number of the memorized code units in the latch memory 32. The content of the up/down counter 45 is monitored by first and second decoders 46 and 47 which produce the first and the second indication signals I1 and I2 when the content of the up/down counter 45 is equal to or greater than two and is equal to four, respectively.

The first indication signal I1 is delivered to the instruction execution unit 22 while the second indication signal I2 is delivered to the controller 21.

Responsive to the first indication signal I1, the readout control circuit 38' of the instruction execution unit 22 decides whether a single word or a double word is read out of the latch memory 32. The readout control circuit 38' indicates readout of a single word on no reception of the first indication signal I1.

On the other hand, the controller 21 supplies the queue control circuit 31c with the write-in enable signal WR when the second indication signal I2 is given from the queue control circuit 31c. Therefore, a single input instruction code unit is written into the latch memory 33. Otherwise, the write-in enable signal WR is sent from the controller 21 to the queue control circuit 31c. This shows that no input instruction code unit is supplied to the latch memory 33.

As mentioned above, the first and the second indication signals I1 and I2 are indicative of states of the latch memory 33. Accordingly, the controller 21 and the instruction execution unit 22 can carry out write-in and readout in consideration of the states of the latch memory 33.

Figure 13:
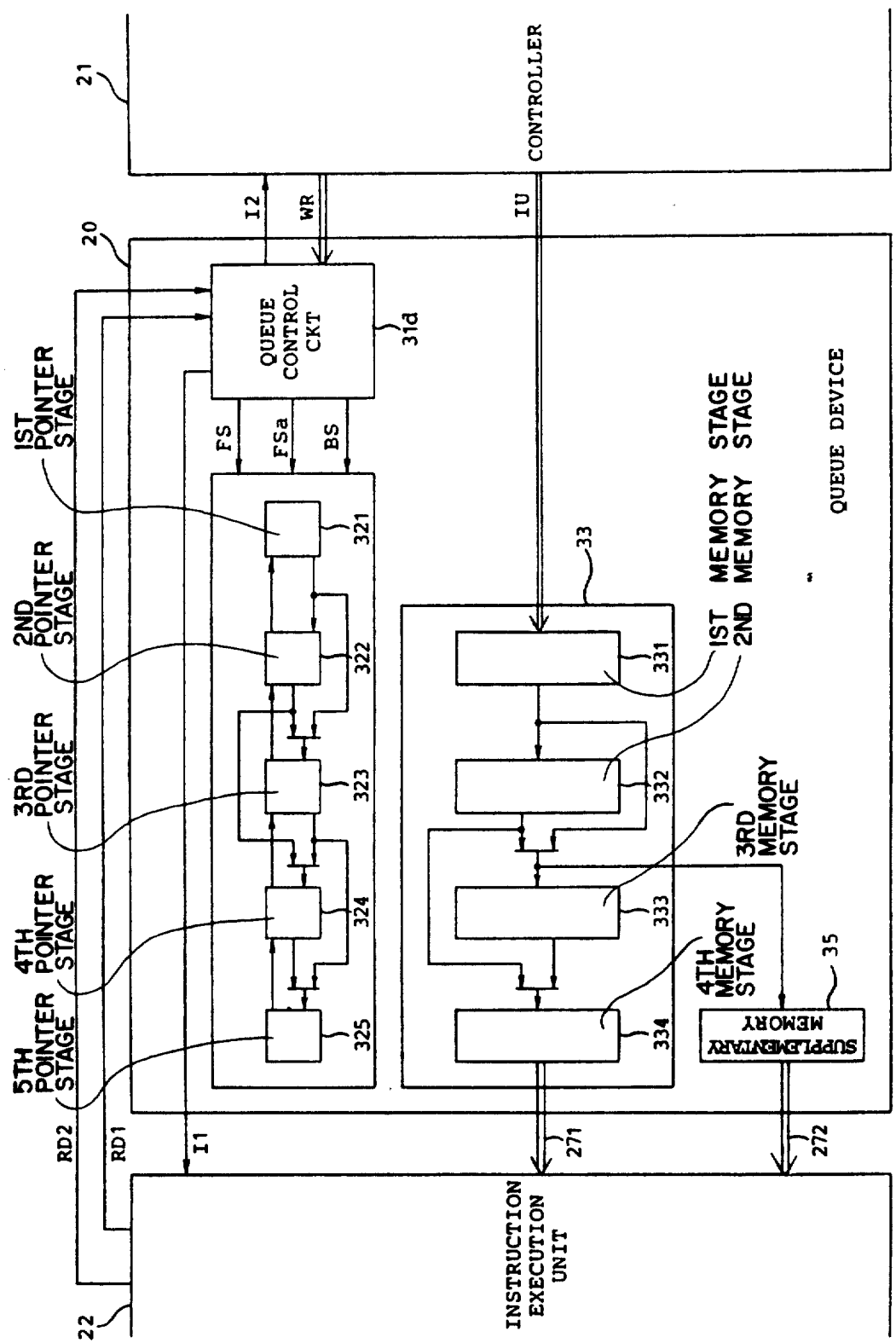
FIG. 13 is a block diagram of a queue device according to a fourth embodiment of this invention.

Referring to FIG. 13, a queue device 20 according to a fourth embodiment of this invention is substantially equivalent to a combination of the queue devices illustrated in FIGS. 11 and 12. More specifically, the illustrated queue device 20 comprises a queue control circuit 31d which is supplied with the first and the second readout enable signals RD1 and RD2 and with the write-in enable signal WR to produce the additional forward shift signal FSa in addition to the forward shift signal FS and the backward shift signal BS like in FIG. 11. Responsive to the additonal forward shift signal FSa, the queue pointer 32a shifts the pointer signal of the logic "1" level forwards by two pointer stages. In order to carry out forward shift operation of two pointer stages, OR gates are located between the second and the third pointer stages 322 and 323, between the third and the fourth pointer stages 323 and 324, and between the fourth and the fifth pointer stages 324 and 325, respectively. Each OR gate is connected to both an adjacent one of the pointer stages and a preceding one.

Likewise, the latch memory 33 comprises OR gates between the second and the third memory stages 332 and 333 and between the third and the fourth memory stages 333 and 334.

Figure 14:
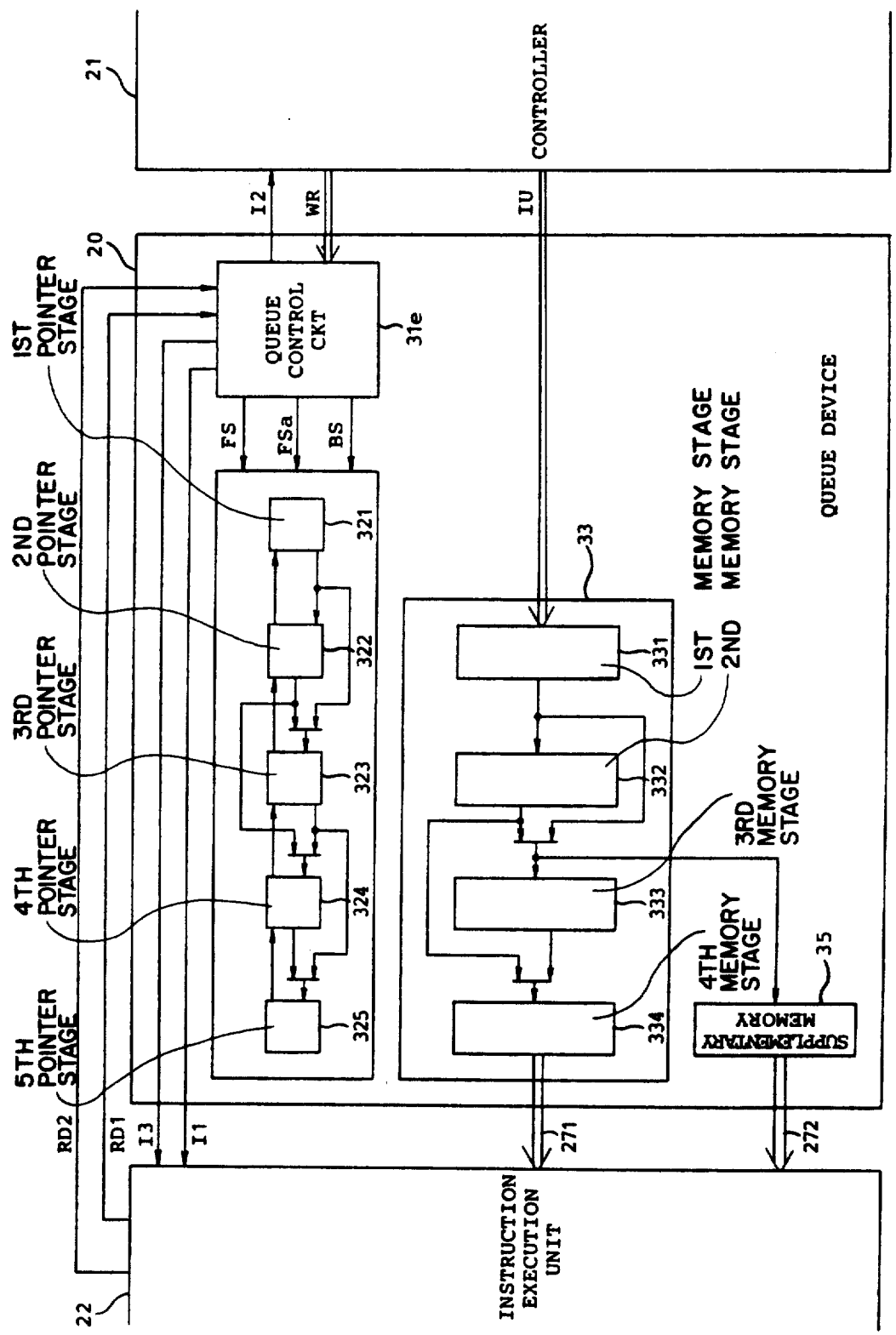
FIG. 14 is a block diagram of a queue device according to a fifth embodiment of this invention.

Referring to FIG. 14, a queue device 20 according to a fifth embodiment of this invention is similar in structure and operation to that illustrated in FIG. 13 except that a queue control circuit 31e produces a third indication signal I3 indicative of the fact that only a single word is memorized in the latch memory 33 in addition to the first and the second indication signals I1 and I2 described in conjunction with FIG. 12. The third indication signal I3 can be produced by connecting a third decoder 48 (depicted at a broken line in FIG. 12) to the counter 45 and is delivered from the queue control circuit 31d to the instruction execution unit 22.

With this structure, both the first and the third indication signals I1 and I3 are produced from the queue control circuit 31e when two or more words are memorized as memorized code units in the latch memory 33. This means that the instruction execution unit 22 can read a single word in the form of the output digital signal unit OU out of the latch memory 33 when only one word is memorized in the latch memory 33. On the other hand, readout of two words is carried out only when the first indication signal I1 is supplied from the queue control circuit 31e to the instruction execution unit 22.

While this invention has thus far been described in conjunction with several embodiments thereof, it will readily be possible for those skilled in the art to put this invention into practice in various other manners. For example, the illustrated queue device 20 can be used as a data queue device. This shows that a sequence of data units may be produced as each input and digital signal unit. In this event, each queue control circuit illustrated in FIGS. 5, 11, 12, 13, and 14 is supplied with a data write-in enable signal and is operable in a manner similar to that illustrated in the above-mentioned figures. With this data queue device, the data queue device can memorize a data block which includes data units of different data lengths and which is previously transferred from the controller 21. Each data unit is read out of the data queue device one at a time on execution of an instruction even when each data unit is not composed of a single word. This means that each data unit can be transferred at a high speed to the instruction execution unit 22. The supplementary memory 35 may not always have a bit length of a single word.

What is claimed is:

1. A queue device for use in combination with a digital signal producing circuit which produces a sequence of digital signal units and with a processing circuit which is supplied through said queue device with said digital signal units as output digital signal units, each of said digital signal units having a single word length, said queue device comprising:

a first-in first-out memory device having first through N-th memory stages to store said digital signal units one at a time as stored digital signal units, each of said memory stages having said single word length, to successively output each stored digital signal unit as a basic sequence of said stored digital signal units unit by unit, where N is a natural number; and a supplementary memory of said single word length, connected to an n-th memory stage selected from said first through N-th memory stages, to store an n-th one of said stored digital signal units sent from said n-th memory stage to successively output an n-th one of said stored digital signal units as an additional sequence of said stored digital signal units;

both said first-in first-out memory device and said supplementary memory being directly connected to said processing circuit such that stored digital signal units of said basic sequence and of said additional sequence which have a word length equal to twice said single word length are concurrently transferred to said processing circuit as said output digital signal units under control of said processing circuit.

2. A queue device as claimed in claim 1, wherein said processing circuit produces a first readout indication signal indicative of readout of said basic sequence and a second readout indication signal indicative of readout of both said basic sequence and said additional sequence and said digital signal producing circuit produces a write-in indication signal indicative of write-in of each of said digital signal units, said queue device further comprising:

receiving means for receiving said first and said second readout indication signals and said write-in indication signal to produce at least one shift control signal;

a pointer, connected to said first-in first-out memory device and to said receiving means, said pointer having a plurality of pointer stages connected to said first through said N-th memory stages, said pointer holding a pointer signal in each of said pointer stages to point out one of said first through said N-th memory stages in accordance with said at least one shift control signal to enable a memory stage.

3. A queue device as claimed in claim 2, wherein said at least one shift control signal includes a forward shift control signal for shifting a pointer signal forwards and a backward shift control signal for shifting a pointer signal backwards, and wherein said receiving means comprises:

shift detection means, supplied with said first and said second readout indication signals and with said write-in indication signal, for detecting a shift mode indicative of either one of a shift forward and a shift backward of said pointer signal, based on said first and said second readout indication signals and on said write-in indication signal, to produce a shift indication signal representative of said shift mode;

first generating means, coupled to said shift detection means, for generating said forward shift control signal when said shift indication signal indicates a shift forward; and second generating means, coupled to said shift detection means, for generating said backward shift control signal when said shift indication signal indicates a shift backwards.

4. A queue device as claimed in claim 2, wherein said receiving means further comprises:

monitoring means, supplied with said first and said second readout indication signals and with said write-in indication signal, for monitoring a number of stored digital signal units in said first-in-first-out memory device;

first signal producing means, coupled to said monitoring means, for producing a first indication signal when said number of stored digital signal units is greater than unity;

second signal producing means, coupled to said monitoring means, for producing a second indication signal when said number of stored digital signal units becomes equal to N; and means for supplying said first and second indication signals to said processing circuit and to said digital signal producing circuit, respectively.

5. A queue device as claimed in claim 4, wherein said receiving means further comprises:

third signal producing means, coupled to said monitoring means, for producing a third indication signal when said number of stored digital signal units is equal to unity; and means for supplying said third indication signal to said processing circuit.

6. A queue divice for use in combination with a digital signal producing circuit which produces a sequence of digital signal units and with a processing circuit which is supplied through said queue device with said digital signal units as output digital signal units, each of said digital signal units having a predetermined word length, said queue device comprising:

a first-in first-out memory device having first through N-th memory stages to successively shift each of said digital signal units towards said N-th memory stage after each of said digital signal units is stored in said first memory stage to successively output a basic sequence of digital signal units;

a supplementary memory, coupled to a predetermined memory stage of said first through said N-th memory stages other than said N-th memory stage, to store a digital signal unit which is sent from said predetermined memory stage to successively output a digital signal unit which is sent from said predetermined memory stage as an additional sequence of digital signal units; and means for selectively supplying said processing circuit with either said basic sequence and said additional sequence, or with said basic sequence.

* * * * *